Aug. 30, 1966    H. STROBL    3,269,663
BYPASS GAS TURBINE JET ENGINE THRUST TUBE
ARRANGEMENT AND THRUST DIVERTING MEANS
Filed Aug. 15, 1963    2 Sheets-Sheet 1

United States Patent Office 3,269,663
Patented August 30, 1966

3,269,663
BYPASS GAS TURBINE JET ENGINE THRUST TUBE ARRANGEMENT AND THRUST DIVERTING MEANS
Heinrich Strobl, Munich, Germany, assignor to Junkers Flugzeug- und Motorenwerk AG, Munich, Germany
Filed Aug. 15, 1963, Ser. No. 302,262
Claims priority, application Germany, Aug. 16, 1962,
J 22,260, J 22,261
14 Claims. (Cl. 239—265.29)

The present invention relates to a thrust tube arrangement for jet engines, and more particularly to a thrust tube arrangement for a bypass gas turbine jet engine for supersonic flight.

Bypass jet engines provided with a turbine driven fan produce a secondary fluid stream of cold air which surrounds the primary fluid stream of hot combustion gases, flowing in the same direction and mixing with the same rearwardly of the discharge opening of the jet engine.

In conventional constructions of this type, the outlets through which the inner hot fluid stream and the outer cold fluid stream are discharged are located substantially in a common plane, or the primary and secondary fluid streams mix within the discharge tube.

During operation of jet engines of this type at speeds below supersonic speeds, the static pressures of the two fluid streams are substantially the same, and as far as the efficiency of the engine is concerned, there is not distinction between a common discharge tube, or two separated discharge tubes.

However, if an engine of this type is operated at supersonic speeds and higher Mach numbers, the efficiency, and thereby the power of the jet engine is reduced.

At supersonic speeds, and at high Mach numbers, the ram effect causes a substantial compression of the air forwardly of the compressor so that the compressor for the secondary fluid stream has to increase the pressure only slightly to equalize the static pressure of the secondary air stream with the static pressure of the primary stream of combustion gases. Such low pressure increase corresponds to a small air flow and to a low turbine and compressor speed.

Very high after burner temperatures are required for the operation of such an engine under such conditions at supersonic flight speeds, which results in a very high fuel consumption. It is one object of the invention to overcome these disadvantages and to provide a jet engine which operates efficiently at supersonic speeds and has a low fuel consumption.

Another object of the invention is to provide a thrust tube arrangement for a jet engine in which the primary and secondary fluid streams do not influence each other, so that it is not necessary to equalize the static pressures of the primary and secondary fluid streams.

Another object of the invention is to arrange the outlet openings through which the primary stream of hot combustion gases, and the secondary stream of air, are discharged, at such a distance from each other that the primary and secondary streams do not mix.

With these objects in view, the present invention is mainly concerned with an improvement of the thrust tube arrangement of a bypass gas turbine jet engine which increases the efficiency of the engine during supersonic flight operations.

One embodiment of the invention comprises an inner thrust tube having a first rear edge forming a first outlet opening for the discharge of a primary fluid stream of combustion gases; and an outer tube surrounding the inner thrust tube and defining with the same an annular passage for a secondary fluid stream of cold air produced by a turbine driven compressor.

In accordance with the present invention, the outer tube has a second rear edge defining a second outlet opening for the discharge of the secondary fluid stream. The second outlet opening is located forwardly of the first outlet opening such a distance in the longitudinal direction of the tubes that primary and secondary fluid streams of different static pressure do not influence each other.

The distance between the first and second outlet openings is at least half the radial width of the annulus defining the second outlet opening. In the preferred embodiment of the invention, this distance is from one to five times the radial width of the annulus defining the second outlet opening.

In accordance with another embodiment of the invention, the rear end of the outer tube is formed as Laval nozzle having a divergent rear end terminating in an annular rear edge surrounding the outer surface of the inner thrust tube spaced therefrom and defining with the same an annular outlet opening for the discharge of the secondary fluid stream. The annular outlet of the Laval nozzle is spaced in the direction of the tubes from the first outlet of the inner thrust tube such a distance that mixing of the primary and secondary fluid streams is prevented.

A nozzle of known construction permitting an adjustment of the narrowest cross section of the passage for the secondary fluid stream is preferably provided in order to provide optimal conditions for the operation of the compressor for the secondary stream of air by adjusting the cross sectional area of the critical section of the passage for the secondary fluid stream.

The two above described embodiments of the invention can be operated at a supersonic flight speeds at a considerably improved air flow rate as compared with conventional constructions.

It is known to deflect or reverse the jet propulsion stream for producing a vertical lifting force, or for producing a braking effect.

A modified embodiment of the invention includes means which permit, if desired, the mixing of the primary and secondary stream in a deflected or reversed stream for the above explained purposes.

The mixing of the streams is of no disadvantage at low Mach numbers since the ram effect is less pronounced.

Consequently, it is also an object of the present invention to provide a thrust tube arrangement of a jet engine which is operable with separated primary and secondary fluid streams at high supersonic speeds, and with mixed primary and secondary fluid streams for the purpose of producing a lifting force at lower speeds.

With these objects in view, the modified embodiment of the invention comprises an inner tube means having a front portion and a rear portion which is movable between a first position forming a continuous thrust tube with the front portions and a second position in which the rear portion is spaced from the front portion of the inner tube means. As in the above discussed embodiments, an outer tube surrounds the inner tube means, and the outlets of the outer tube and of the rear portion of the inner tube means are spaced in longitudinal direction of the tubes in the first position in which a continuous thrust tube is formed.

The outer tube has forwardly of its outlet opening, a transverse discharge nozzle which is adapted to deflect a fluid stream passing thereto in such a manner that either a lifting force or a braking effect is produced.

Means are provided for closing the outlet openings of the inner and outer tubes while the rear portion of the inner tube is spaced from the front portion of the same, and for opening the transverse discharge nozzle when operation at low flight speeds is desired. In this condition of the thrust tubes, the primary and secondary fluid streams mix in a mixing chamber formed at the rear end of the outer tube, and are transversely discharged through the discharge nozzle in the outer tube so that a lifting or braking effect is produced.

Closure means, such as flaps, guide vanes, baffles, swirl inducers, and air injection may be used for this purpose.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
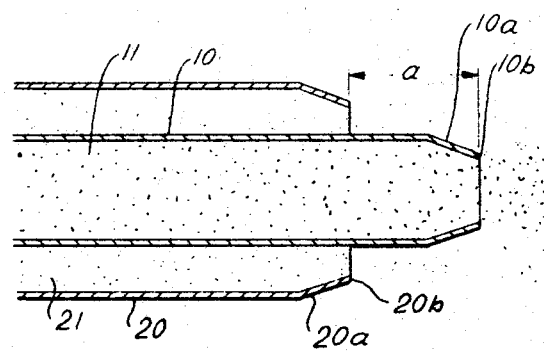
FIG. 1 is a fragmentary schematic longitudinal sectional view illustrating one embodiment of the invention, with conventional parts omitted for the sake of clarity.

Referring now to the drawings, and more particularly to FIG. 1, an outer tube 20 surrounds an inner tube 10 of smaller diameter. The interior of the inner tube 10 is connected to the jet engine so that a first fluid stream of hot combustion gases passes therethrough from the left to the right as viewed in FIG. 1, and is discharged through the outlet opening at the rear end of a tapered reduced end portion 10a bounded by an edge 10b.

An annular passage 21 is formed between the outer tube 20 and the inner tube 10 and receives a fluid stream of cold air from the turbine driven compressor of the engine. The second stream is discharged through a tapered end portion which terminates in a circular rear edge 20b defining with the outer surface of the inner thrust tube 10 an annular outlet opening for the second fluid stream.

The edges 10b and 20b are spaced from each other the distance $a$ in the longitudinal direction of the tubes, and this distance is selected in such a manner that the first and second fluid streams do not influence each other so that it is not necessary to discharge the two fluid streams at the same static pressure.

As explained above, the distance $a$ is at least half the radial width of the annular outlet opening formed by the circular edge 20b and by the outer surface of the inner thrust tube 10, but preferably from one to five times the radial width of this outlet opening.

Figure 2:
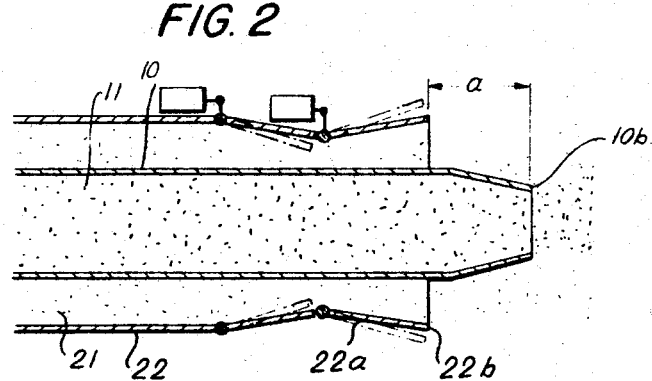
FIG. 2 is a fragmentary schematic sectional view illustrating another embodiment of the invention.

In the embodiment of FIG. 2, the thrust tube 10 is surrounded by an outer tube 22 whose rear end is formed by a Laval nozzle having a divergent rear end portion terminating in the circular edge 22b which defines an annular outlet for the passage 21 formed between the inner thrust tube 10 and the outer tube 22. Rear edge 22b is located forwardly of the rear edge 10b a distance $a$ which is selected as explained above.

The stream of hot combustion gases passing through passage 11 and the stream of cold air passing through passage 21 do not directly mix due to the staggering of the rear ends of tubes 10 and 22, so that streams having different static pressure do not influence each other.

Figure 3:
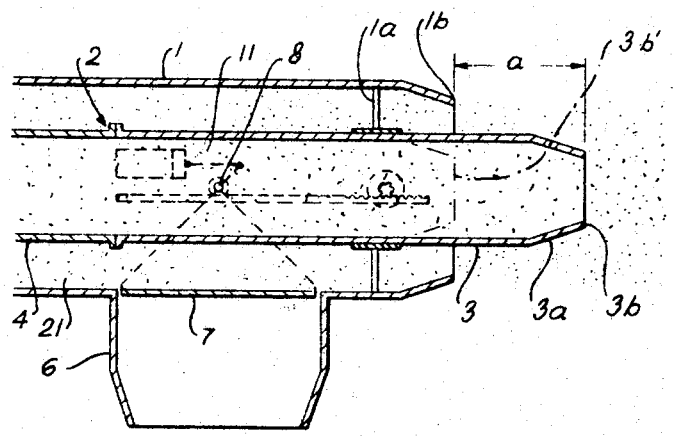
FIG. 3 is a fragmentary schematic sectional view illustrating a third embodiment of the invention in a first operational condition.
Figure 4:
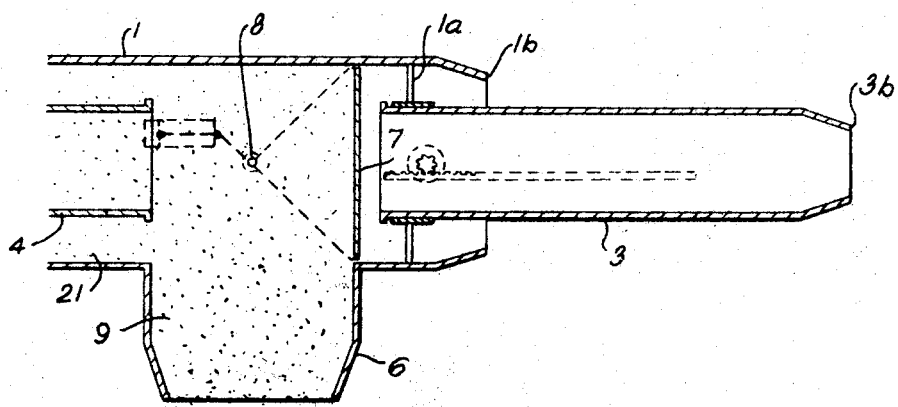
FIG. 4 is a fragmentary schematic sectional view illustrating the embodiment of FIG. 3 in another operational condition.

In the embodiment of FIGS. 3 and 4, the arrangement can be operated in the position of FIG. 3 in the same manner as explained for the embodiment of FIG. 1. An outer tube 1 surrounds an inner tube 2 which includes a front portion 4 and a rear portion 3 having a tapering rear end 3a terminating in a circular edge 3b defining the outlet opening for the passage 11 of tube 2 through which hot combustion gases are discharged.

An outer tube 1 surrounds tube 2 and forms with the same an annular passage 21 for a fluid stream of cold air. The rear end of tube 1 tapers and terminates in a circular edge 1b defining an annular outlet for the passage 21. Rear edge 1b is spaced from the rear edge 3b the distance $a$ when the rear portion 3 is in the position illustrated in FIG. 3 forming a continuous thrust tube with the front portion 4.

The outer tube 1 has a transverse downwardly projecting discharge nozzle 6 which in the operational condition of FIG. 3, is closed by a closure plate 7 of a closure means which is mounted on the outer tube 1 for turning movement about a transverse axis 8.

The rear portion 3 is supported for longitudinal sliding movement in a bearing 1a which is mounted in the interior or the outer tube 1.

In the position illustrated in FIG. 3, the arrangement operates as described with reference to FIG. 1, and the two streams of different static pressure discharged through the outlet openings at the rear ends of tube 1 and rear portion 3 of tube 2, do not influence each other due to the longitudinal staggering of the two outlets. The transverse discharge nozzle is inoperative, since it is closed by the closure plate 7.

As explained above, the arrangement shown in FIGS. 1, 2 and 3 are advantageously operated at supersonic speeds where due to the ram effect, the two fluid streams are discharged at different static pressures.

When it is desired to produce a downward directed transverse thrust for the purpose of producing a vertical lifting force, the rear portion 3 of the inner tube 2 is moved to the right as viewed in FIGS. 3 and 4 while sliding in the bearing means 1a until it is in the position shown in FIG. 4, separated from the front portion 4. Thereupon, closure means 7, 8 is turned to the position shown in FIG. 4 so that the rear end of tube 1 and thereby the outlets at the rear ends of tubes 1 and 3 are closed, while the discharge nozzle 6 is open.

Consequently, the hot fluid stream of combustion gases discharged from the front portion 4 of the inner tube enters a mixing chamber 9 formed in the outer tube 1 by the closure plate 7, and mixes with the cold air stream passing through the annular passage 21. The mixed stream is transversely discharged in downward vertical direction and produces a lifting force which may be used during a vertical take-off or landing operation. By changing the shape of the discharge nozzle 6, a reversed thrust may be produced for braking purposes.

In the event that a separation of the streams passing through passages 11 and 21 in the condition of FIG. 3 is not desired, the rear portion 3 is shortened so that the rear edge 3b' and the outlet opening thereof is located in the same transverse plane as the rear edge 1b and the outlet opening of passage 21. The closure means described with reference to FIGS. 3 and 4 is advantageously used in such a modified arrangement, since it permits the adaptation of the discharge tubes to operation during forward flight, or for producing a vertical lifting force.

It will be understood that each of the elements described above, or two or more together, may also find a useful application in other types of jet engines differing from the types described above.

While the invention has been illustrated and described as embodied in a discharge thrust tube arrangement adapted for operation at supersonic flight speed and for producing a vertical lifting force, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

Bypass gas turbine engines for which this invention is provided are known, one engine being for instance published in the U.S. Patent 3,060,680. The outer cold stream as mentioned in the specification may be heated so that also in the secondary passage a hot fluid flows. The construction of such an engine is not shown with all details in the description, because the invention has no influence on it with exception of a few details. The means to adjust the nozzle area also known, for instance as published in the U.S. Patent 3,048,971. The inner tube may be moved in longitudinal direction as it is for instance shown in FIG. 4 by a rack-and-pinion gear driven by a hydraulic or electrical motor.

What is claimed as new and desired to be secured by Letters Patent is:

1. In a bypass gas turbine jet engine for supersonic flight, in combination, an inner thrust tube having a first rear edge forming an outlet opening for the discharge of a primary fluid stream; an outer tube surrounding said inner thrust tube and defining with the same an annular passage for a secondary fluid stream, said outer tube having a second rear edge defining an outlet opening for the discharge of said secondary fluid stream and being located forwardly of said first rear edge such a distance in the longitudinal direction of said tubes that primary and secondary fluid streams of different static pressure do not influence each other, said outer tube having forwardly of said second rear edge a downwardly projecting transverse discharge nozzle; and means mounted in said outer tube movable between a first position closing said discharge nozzle, and a second position for closing said outlet openings formed by said first and second rear edges, for forming in said outer tube a mixing chamber connecting said inner tube and said annular passage with said discharge nozzle so that said primary and secondary fluid streams mix in said mixing chamber whereby a mixture of said primary and secondary fluid streams is transversely deflected and discharged through said transverse discharge nozzle for producing a lifting force.

2. In a bypass gas turbine jet engine for supersonic flight, in combination, a fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining with said rear portion of said inner tube a second outlet opening for the discharge of said secondary fluid stream in said first position, said second rear edge being located forwardly of said first rear edge such a distance in the longitudinal direction of said tubes that in said first position of said rear portion of said inner tube means primary and secondary fluid streams of different static pressures do not influence each other, said other tube having forwardly of said second rear edge a downwardly projecting transverse discharge nozzle; and closure means mounted in said second tube rearwardly of said front portion of said inner tube and having a first position closing said discharge nozzle, and being adapted to be placed in said first position when said rear portion of said inner tube means is in said first position, said closure means having a second position closing said first outlet opening in said second position of said rear portion of said inner tube means and also closing said second outlet opening and opening said discharge nozzle whereby a mixing chamber connecting said front portion of said inner tube and said annular passage with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle for producing a lifting force.

3. In a bypass gas turbine jet engine for supersonic flight, in combination, a fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said first portion in the longitudinal direction of said thrust tube; said outer tube surrounding said inner tube means and defining in said first position with said continuous thrust tube an annular passage for a secondary fluid stream, said outer tube having a second rear edge defining with said rear portion of said inner tube a second outlet opening for the discharge of said secondary fluid stream in said first position, said second rear edge being located forwardly of said first rear edge such a distance in the longitudinal direction of said tubes that in said first position of said rear portion of said inner tube means primary and secondary fluid streams of different static pressure do not influence each other, said outer tube having forwardly of said second rear edge a downwardly projecting transverse discharge nozzle; and closure means mounted in said second tube rearwardly of said front portion of said inner tube for turning movement about an axis transverse to the longitudinal direction of said second tube and to said transverse discharge nozzle and having a first position closing said discharge nozzle, and being adapted to be placed in said first position when said rear portion of said inner tube means is in said first position, said closure means having a second position closing the front end of said rear portion and thereby said first outlet opening in said second position of said rear portion of said inner tube means and also closing the rear end of said outer tube and thereby said second outlet opening and opening said discharge nozzle whereby a mixing chamber connecting said front portion of said inner tube and said annular passage with said discharge nozzle is formed in said outer tube forwardly of said closed first and second outlet openings and rearwardly of the rear end of said front portion of said inner tube in said second position of said rear portion of same so that a mixture of said primary and secondary fluid streams is transversely deflected in said mixing chamber and discharged through said transverse discharge nozzle for producing a lifting force.

4. In a bypass gas turbine jet engine for supersonic flight, in combination, a unitary fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining with said rear portion of said inner tube a second outlet opening for the discharge of said secondary fluid stream in said first position, said second rear edge being located forwardly of said first rear edge such a distance in the longitudinal direction of said tubes that in said first position of said rear portion of said inner tube means primary and secondary fluid streams of different static pressure do not influence each other, said outer tube having forwardly of said second rear edge a transverse discharge nozzle; bearing means mounted in said outer tube rearwardly of said transverse discharge nozzle and supporting said rear portion of said inner tube means for movement between said first and second positions; and closure means mounted in said second tube forwardly of said bearing means and rearwardly of said front portion of said inner tube and having a first position closing said discharge nozzle, and being adapted to be placed in said first position when said rear portion of said inner tube means is in said first position, said closure means having a second position closing said first outlet opening in said second position of said rear portion of said inner tube means and also closing said second outlet opening and opening said discharge nozzle whereby a mixing chamber communicating with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle.

5. In a bypass gas turbine jet engine for supersonic flight, in combination, a unitary fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining with said rear portion of said inner tube a second outlet opening for the discharge of said secondary fluid stream in said first position, said second rear edge being located forwardly of said first rear edge such a distance in the longitudinal direction of said tubes that in said first position of said rear portion of said inner tube means primary and secondary fluid streams of different static pressure do not influence each other, said outer tube having forwardly of said second rear edge a transverse discharge nozzle; bearing means mounted in said outer tube rearwardly of said transverse discharge nozzle and supporting said rear portion of said inner tube means for movement between said first and second positions; and closure means mounted in said second tube forwardly of said bearing means and rearwardly of said front portion of said inner tube for turning movement about an axis transverse to the longitudinal direction of said second tube and to said transverse discharge nozzle and having a first position closing said discharge nozzle, and being adapted to be placed in said first position when said rear portion of said inner tube means is in said first position, said closure means having a second position closing the front end of said rear portion and thereby said first outlet opening in said second position of said rear portion of said inner tube means and also closing the rear end of said outer tube and thereby said second outlet opening and opening said discharge nozzle whereby a mixing chamber communicating with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle.

6. In a bypass gas turbine jet engine for supersonic flight, in combination, a unitary fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining with said rear portion of said inner tube a second annular outlet opening for the discharge of said secondary fluid stream in said first position, said second rear edge being located forwardly of said first rear edge a distance from one to five times the radial width of said second outlet opening so that in said first position of said rear portion of said inner tube means primary and secondary fluid streams of different static pressure do not influence each other, said outer tube having forwardly of said second rear edge a transverse discharge nozzle; bearing means mounted in said outer tube rearwardly of said transverse discharge nozzle and supporting said rear portion of said inner tube means for movement between said first and second positions; and closure means mounted in said second tube forwardly of said bearing means and rearwardly of said front portion of said inner tube for turning movement about an axis transverse to the longitudinal direction of said second tube and to said transverse discharge nozzle and having a first position closing said discharge nozzle, and being adapted to be placed in said first position when said rear portion of said inner tube means is in said first position, said closure means having a second position closing the front end of said rear portion and thereby said first outlet opening in said second position of said rear portion of said inner tube means and also closing the rear end of said outer tube and thereby said second outlet opening and opening said discharge nozzle whereby a mixing chamber communicating with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle for producing a lifting force at low speeds.

7. In a bypass gas turbine jet engine for supersonic flight, in combination, a fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining a second outlet opening for the discharge of said secondary fluid stream in said first position, said outer tube having forwardly of said second rear edge a downwardly projecting transverse discharge nozzle; and closure means mounted in said second tube rearwardly of said front portion of said inner tube and having a first position closing said discharge nozzle, and being adapted to be placed in said first position when said rear portion of said inner tube means is in said first position, said closure means having a second position closing said first outlet opening in said second position of said rear portion of said inner tube means and also closing second outlet opening and opening said discharge nozzle whereby a mixing chamber connecting said front portion of said inner tube and said annular passage with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle for producing a lifting force.

8. In a bypass gas turbine jet engine for supersonic flight, in combination, a fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining a second outlet opening for the discharge of said secondary fluid stream in said first position, said outer tube having forwardly of said second rear edge a downwardly projecting transverse discharge nozzle; and closure means mounted in said second tube rearwardly of said front portion of said inner tube for turning movement about an axis transverse to the longitudinal direction of said second tube and to said transverse discharge nozzle and having a first position closing said discharge nozzle, and being adapted to be placed in said first position when said rear portion of said inner tube means is in said first position, said closure means having a second position closing the front end of said rear portion and thereby said first outlet opening in said second position of said rear portion of said inner tube means and also closing the rear end of said outer tube and thereby said second outlet opening and opening said discharge nozzle whereby a mixing chamber connecting said front portion of said inner tube and said annular passage with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle for producing a lifting force.

9. In a bypass gas turbine jet engine for supersonic flight, in combination, a unitary fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining a second outlet opening for the discharge of said secondary fluid stream in said first position, said outer tube having forwardly of said second rear edge a transverse discharge nozzle; bearing means mounted in said outer tube rearwardly of said transverse discharge nozzle and supporting said rear portion of said inner tube means for movement between said first and second positions; and closure means mounted in said second tube forwardly of said bearing means and rearwardly of said portion of said inner tube and having a first position closing said discharge nozzle, and being adapted to be placed in said first position when said rear portion of said inner tube means is in said first position, said closure means having a second position closing said first outlet opening in said second position of said rear portion of said inner tube means and also closing said second outlet opening and opening said discharge nozzle whereby a mixing chamber communicating with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle.

10. In a bypass gas turbine jet engine for supersonic flight, in combination, a unitary fixed outer tube; an inner tube means having a front portion and a rear portion, said rear portion being movable relative to said outer tube between a first position connected to said front portion for forming with the same a continuous thrust tube for a primary fluid stream, said rear portion having a rear edge forming a first outlet opening for the discharge of the primary fluid stream in said first position, and a second position in which the front end of said rear portion is spaced from the rear end of said front portion in the longitudinal direction of said thrust tube; said outer tube surrounding said inner tube means and defining in said first position with said continuous thrust tube an annular passage for a secondary fluid stream, said outer tube having a second rear edge defining a second outlet opening for the discharge of said secondary fluid stream in said first position, said outer tube having forwardly of said second rear edge a transverse discharge nozzle; bearing means mounted in said outer tube rearwardly of said transverse discharge nozzle and supporting said rear portion of said inner tube means for movement between said first and second positions; and closure means mounted in said second tube forwardly of said bearing means and rearwardly of said front portion of said inner tube for turning movement about an axis transverse to the longitudinal direction of said second tube and to said transverse discharge nozzle and having a first position closing said discharge nozzle, and being adapted to be placed in said first position when said rear portion of said inner tube means is in said first position, said closure means having a second position closing the front end of said rear portion and thereby said first outlet opening in said second position of said rear portion of said inner tube means and also closing the rear end of said outer tube and thereby said second outlet opening and opening said discharge nozzle whereby a mixing chamber communicating with said discharge nozzle is formed in said outer tube forwardly of said closed first and second outlet openings and rearwardly of the rear end of said front portion of said inner tube in said second position of said rear portion the same so that a mixture of said primary and secondary fluid streams is transversely deflected in said mixing chamber and discharged through said transverse discharge nozzle.

11. An arrangement as set forth in claim 10 wherein said discharge nozzle and said outer tube have apertures with the same diameter; and wherein said closure means includes a plate having the same diameter for closing said apertures.

12. An arrangement as set forth in claim 4 wherein said discharge nozzle and said outer tube have apertures with the same diameter; and wherein said closure means includes a plate having the same diameter for closing said apertures.

13. In a by pass gas turbine jet engine for supersonic flight, in combination, an inner thrust tube having a first outlet opening for the discharge of a primary fluid stream; an outer tube surrounding said inner thrust tube and defining with the same an annular passage having an annular second outlet opening for a secondary fluid stream, said outer tube having forwardly of said second outlet opening a downwardly projecting discharge nozzle; and means mounted in said outer tube for movement between a first position closing said discharge nozzle so that said primary and secondary fluid streams are separately discharged from said first and second outlet openings, and a second position for closing said first and second outlet openings and for forming in said outer tube a mixing chamber connecting said inner tube and said annular passage with said discharge nozzle so that said primary and secondary fluid streams mix in said mixing chamber whereby a mixture of said primary and secondary fluid streams is discharged through said downwardly projecting discharge nozzle for producing a lifting force.

14. A jet engine according to claim 13 wherein said first and second outlet openings are spaced along said inner tube a distance between half the radial width and five times the radial width of said annular second outlet opening.

References Cited by the Examiner

UNITED STATES PATENTS

| | | | |
|---|---|---|---|
| 3,060,679 | 10/1962 | Schmitt | 60—35.6 |
| 3,068,646 | 12/1962 | Fletcher. | |
| 3,102,385 | 9/1963 | Lyons | 60—35.6 |
| 3,108,767 | 10/1963 | Eltis et al. | |

FOREIGN PATENTS

| | | |
|---|---|---|
| 812,167 | 4/1959 | Great Britain. |
| 830,232 | 3/1960 | Great Britain. |

MARK NEWMAN, *Primary Examiner.*

A. L. SMITH, *Assistant Examiner.*